(12) United States Patent
Vesikivi

(10) Patent No.: US 10,699,292 B2
(45) Date of Patent: Jun. 30, 2020

(54) SYSTEMS AND METHODS FOR MEASURING MOBILE ADVERTISEMENT EFFECTIVENESS

(71) Applicant: PCMS Holdings, Inc., Wilmington, DE (US)

(72) Inventor: Petri Vesikivi, Espoo (FI)

(73) Assignee: PCMS Holdings, Inc., Wilmington, DE (US)

( * ) Notice: Subject to any disclaimer, the term of this patent is extended or adjusted under 35 U.S.C. 154(b) by 237 days.

(21) Appl. No.: 15/554,978

(22) PCT Filed: Mar. 11, 2016

(86) PCT No.: PCT/US2016/021935
§ 371 (c)(1),
(2) Date: Aug. 31, 2017

(87) PCT Pub. No.: WO2016/149069
PCT Pub. Date: Sep. 22, 2016

(65) Prior Publication Data
US 2018/0040016 A1    Feb. 8, 2018

Related U.S. Application Data

(60) Provisional application No. 62/132,914, filed on Mar. 13, 2015.

(51) Int. Cl.
*G06Q 30/00* (2012.01)
*G06Q 30/02* (2012.01)
(Continued)

(52) U.S. Cl.
CPC ..... *G06Q 30/0242* (2013.01); *G06K 7/10297* (2013.01); *G06K 7/10386* (2013.01); *G06Q 30/0267* (2013.01)

(58) Field of Classification Search
CPC ........... G06Q 30/0242; G06Q 30/0267; G06K 7/10297; G06K 7/10386
See application file for complete search history.

(56) References Cited

U.S. PATENT DOCUMENTS 5,761,648 A    6/1998    Golden et al.
8,255,273 B2   8/2012    Lv et al.
(Continued)

FOREIGN PATENT DOCUMENTS

GB    2433856 A        7/2007
WO    WO 1999/054828 A1    10/1999
(Continued)

OTHER PUBLICATIONS

"Implementing location based information/advertising for existing mobile phone users in indoor/urban environments". O. Rashid . : International Conference on Mobile Business (ICMB'05) (pp. 377-383). 2005 IEEE (Year: 2005).*

*Primary Examiner* — Maria V Vanderhorst
(74) *Attorney, Agent, or Firm* — Condo Roccia Koptiw LLP

(57) ABSTRACT

Systems and/or methods for determining effectiveness of advertisements using devices and/or beacons and/or tags. A mobile device may send a request to an advertisement server. In response to the request, the mobile device may receive, from the advertisement server, an advertisement, an advertisement identifier, and a location identifier. Hie advertisement identifier and the location identifier may be associated with the advertisement. The mobile device may store one or more of the advertisement, the advertisement identifier, or the location identifier. The mobile device may scan (e.g., periodically scan) and/or receive a radio identifier. The radio identifier may be received via a short range signal. A watchdog component (e.g., a watchdog function), running on the mobile device may compare the received radio (Continued)

identifier with the location identifier. If the received radio identifier matches the location identifier, the watchdog function may send a message to the advertisement server.

14 Claims, 9 Drawing Sheets

(51) Int. Cl.
  *G06K 7/10* (2006.01)
  *G05B 19/418* (2006.01)

(56) References Cited

U.S. PATENT DOCUMENTS

| | | | |
|---|---|---|---|
| 8,302,120 B2 | 10/2012 | Ramaswamy | |
| 2003/0014304 A1 | 1/2003 | Calvert et al. | |
| 2006/0136292 A1* | 6/2006 | Bhati | G06Q 30/02 |
| | | | 705/14.41 |
| 2008/0133342 A1 | 6/2008 | Criou et al. | |
| 2008/0139181 A1 | 6/2008 | Lokshin | |
| 2009/0106058 A1 | 4/2009 | McAfee et al. | |
| 2009/0106070 A1 | 4/2009 | Konar | |
| 2009/0199114 A1* | 8/2009 | Lewis | G06Q 30/02 |
| | | | 715/763 |
| 2012/0130796 A1 | 5/2012 | Busch | |
| 2012/0149352 A1* | 6/2012 | Backholm | H04W 52/0258 |
| | | | 455/418 |
| 2013/0024274 A1 | 1/2013 | Villars | |
| 2013/0155107 A1 | 6/2013 | Ashour et al. | |
| 2014/0108129 A1 | 4/2014 | Klein et al. | |
| 2014/0172599 A1 | 6/2014 | Argue et al. | |
| 2014/0362713 A1* | 12/2014 | Agarwal | H04W 24/08 |
| | | | 370/252 |
| 2015/0142552 A1 | 5/2015 | Schmehl et al. | |

FOREIGN PATENT DOCUMENTS

| | | |
|---|---|---|
| WO | WO 2009/001184 A2 | 12/2008 |
| WO | WO 2010/135816 A1 | 12/2010 |
| WO | WO 2013/086357 A3 | 8/2013 |
| WO | WO 2014/065933 A1 | 5/2014 |
| WO | WO 2014/144760 A1 | 9/2014 |

* cited by examiner

SYSTEMS AND METHODS FOR MEASURING MOBILE ADVERTISEMENT EFFECTIVENESS

CROSS REFERENCE TO RELATED APPLICATION

This application is the National Stage Entry under 35 U.S.C. § 371 Patent Cooperation Treaty Application No. PCT/US2016/021935, filed Mar. 11, 2016 which claims the benefit of U.S. Provisional Patent Application No. 62/132,914 filed on Mar. 13, 2015, the contents of which are hereby incorporated by reference herein.

BACKGROUND

Mobile or web-based (e.g., on-line) advertisements or marketing techniques may be used by retailers or companies to deliver advertisements or coupons to a user such as a customer and/or his or her mobile device. For retailers or companies that may use the mobile or web-based (e.g., on-line) advertisements to attract users to its stores, the retailers or companies may wish to know how such advertisements may affect the user and/or an inflow of users. In an example, statistics such as an indication of a number of times the advertisement may have been viewed, coupons redeemed, an analysis of responses to advertisement affectivity questionnaires, and/or the like may be collected to indicate an effectiveness of such advertisements and/or to provide an indication whether or not the advertisements may have worked. Tracking such statistics may be easier when purchasing goods and/or services online that may be associated with the advertisements and/or coupons. Tracking statistics for an effectiveness of a mobile or web-based advertisement or coupon that may cause a user to visit a physical store of the issuing retailers or companies (e.g., determining whether viewing the advertisement or coupon may have caused a user to visit a physical store) may not currently be as feasible, easy, efficient, and/or the like.

SUMMARY

Systems, methods, and instrumentalities are disclosed for determining the effectiveness of advertisements using devices and/or beacons and/or tags. A mobile device may receive an advertisement or ad. The mobile device may receive one or more of an advertisement, an advertisement identifier, or a location identifier from an ad server. The mobile device may receive one or more of the ad, the ad identifier, or the location identifier in response to a request from the mobile device. The advertisement identifier and the location identifier may be associated with the advertisement. The request from the mobile device may include one or more of an application identifier, context information associated with an application, one or more global positioning system (GPS) coordinates, or application state information. The mobile device may display the advertisement to a user. The mobile device may store one or more of the advertisement, the advertisement identifier, or the location identifier. The mobile device may store the advertisement at a first timestamp, e.g., based on when the advertisement is displayed to the user. The mobile device may present to the user an address or a map related to a location associated with the advertisement. The location may be associated with the location identifier.

The mobile device may scan for (e.g., periodically scan) and/or receive a radio identifier. The radio identifier may be received via a short range signal. The received radio identifier may be a wireless local area network (WLAN) service set identifier (SSID), a Bluetooth identifier (BT ID), a near field communication (NFC) tag identifier, a radio frequency identification identifier (RFID), etc.

A watchdog component (e.g., a watchdog function) running on the mobile device may compare the received radio identifier with the location identifier. The watchdog function may be automatically initiated, e.g., when the advertisement is displayed to the user. The watchdog function may be initiated, e.g., based on a radio frequency identifier (RFID). If the received radio identifier matches the location identifier, the watchdog function may send a message to the advertisement server. The message may include and/or indicate the location identifier and the advertisement identifier associated with the location identifier. The message may further include the timestamp when the advertisement was displayed to the user and a second timestamp when a match between the location identifier and the received radio identifier was found.

The Summary is provided to introduce a selection of concepts in a simplified form that may be further described below in the Detailed Description. This Summary is not intended to identify key features or essential features of the claimed subject matter, not is it intended to be used to limit the scope of the claimed subject matter. Furthermore, the claimed subject matter is not limited to the examples herein that may solve one or more disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1:
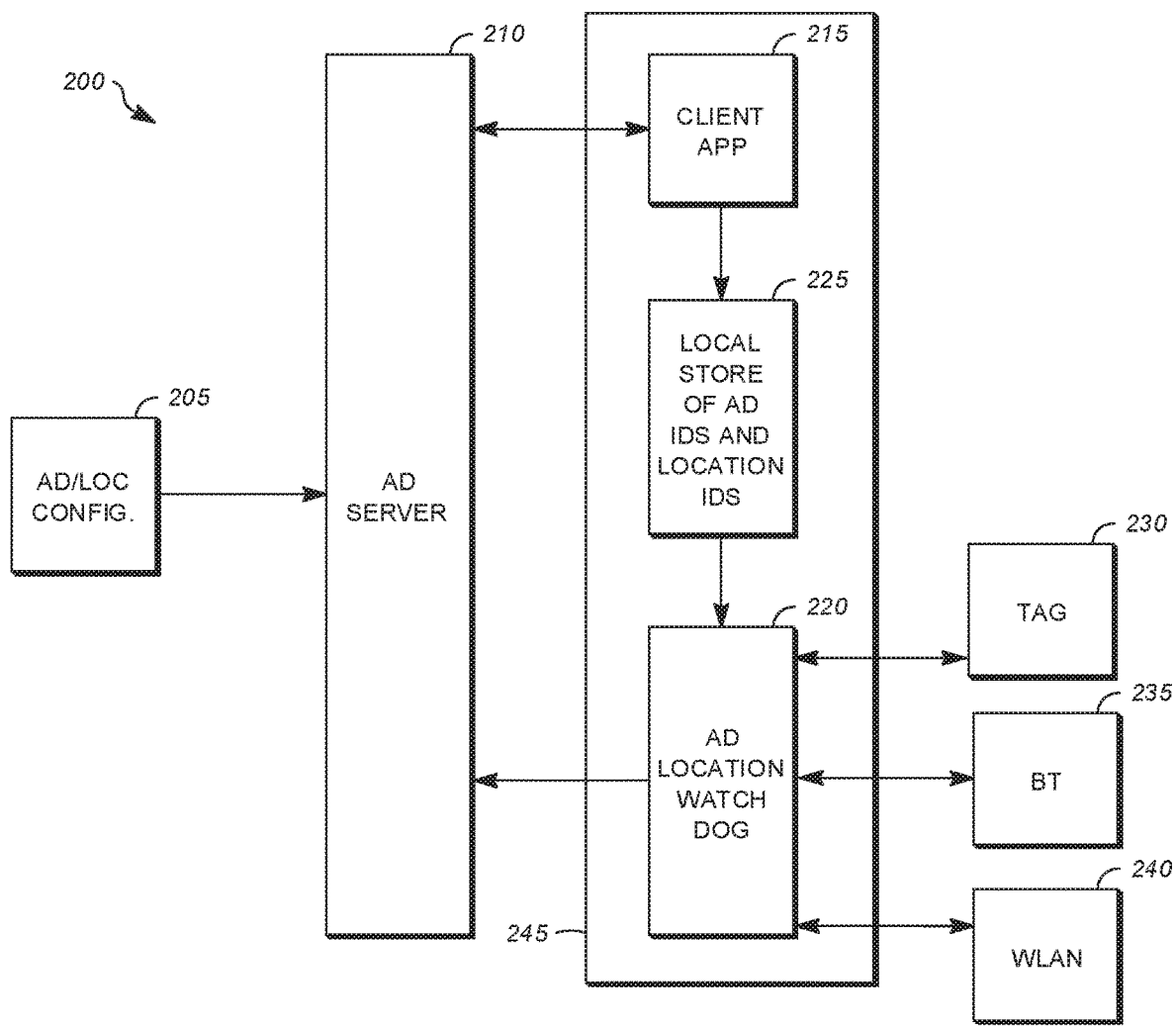
FIG. 1 depicts an example block, system diagram that may be used to track advertisement effectiveness as described herein.

A detailed description of illustrative embodiments will now be described with reference to the various figures.

Although this description provides a detailed example of possible implementations, it should be noted that the details are intended to be exemplary and in no way limit the scope of the application. In addition, the figures may illustrate flow charts, which are meant to be exemplary. Other embodiments may be used. The order of the messages may be varied where appropriate. Messages may be omitted if not needed, and, additional flows may be added.

There may be challenges associated with on-line and other advertisements (e.g., or ads as used herein), e.g., how to measure the effectiveness of such ads. For example, typically, the business models in the advertisement business may be based on measuring impressions and clicks as well as providing questionnaires to consumers about the ads and their effects. For goods that may be bought on-line, an advertiser or business may prove (e.g., easier prove) an effectiveness of the advertisement or coupon. This may increase the value of these advertisements as the advertiser may get a share of the sales as opposed to getting a payment based on the number of clicks or impressions. Examples herein may include systems and/or methods that may enable traditional (e.g., non-online) businesses or merchants to track an effectiveness of mobile advertisements or coupons (e.g., an effectiveness of an online advertisement causing a consumer or user of a mobile device to visit a retail store associated with a business or merchant).

Currently, over 50% of Internet traffic may be coming from mobile devices such as mobile phones, tablets, and/or the like and users thereof, but advertisement revenue from mobile advertisements may be less than 50%. As such, systems and/or methods described herein may enable an increase in tracking of ad effectivity. In examples, this may potentially increase the perceived value of mobile advertisements and enable new business models for on-line advertisers. Collecting evidence of ad effectivity may be based on measuring the ad views and/or ad revenues. Changes in revenues may be caused by one or more factors and, therefore, it may not be possible to know which part of the change may have been contributed by the mobile ad.

Further, in general, mobile ads may be more effective and more personalized than other types of on-line ads. Unfortunately, this may not be not reflected in the ways the ads may be used. Additionally, in examples, mobile ads per page views or a model thereof may be more expensive than other on-line ads. Unfortunately, there may not be a way to automatically collect statistics of how many people actually visited a store location (e.g., a brick and mortar store location) after seeing an on-line ad, for example, on such mobile ads per page views or the model thereof. Tracking or collecting such statistics may increase the value and/or effectiveness of mobile ads. For example, as long as this information may not be known, it may be hard to determine whether the ad may be effective and may also be hard to analyze what makes an ad effective and/or how to provide effective ads.

As such, for companies that may use on-line mobile ads to attract visitors to their physical stores, it may be beneficial to know how mobile ads affect the inflow of customers (e.g., by collecting statistics) and to learn which ads work (e.g., what types of ads work) and which ads do not work. As described herein, this may be currently tracked if a user or viewer of a mobile ad may purchase on-line advertised goods, but may not be suitably tracked for a user viewing the mobile ad and subsequently visiting a retail store associated therewith.

As such, systems and/or methods may be provided herein for enabling a mobile advertisement to be tracked and/or an effectiveness for the mobile advertisement determined associated with a user that views the mobile advertisement who may visit a retail store (e.g., a brick and mortar retail store) associated with the mobile advertisement. In such systems and/or methods, advertisement identifiers (IDs) of advertisements, such as mobile advertisements a user may have seen, may be collected. The ad IDs of the ads may be collected by a mobile device. The advertisement IDs may be linked with IDs in a retail store or in surroundings of a retail store. In examples herein, the IDs may be Bluetooth IDs (e.g., of Bluetooth low energy (BLE) devices), IDs associated with tags or beacons such as IDs that may be read from tags (e.g., RFID tags or beacons) or point of sales devices, service set identifiers (SSIDs) of wireless local area networks (WLANs), and/or the like. In an example (e.g., when a user enters a retail store), a user device may collect the IDs that may be surrounding it (e.g., available in the store or an area of the store close to the user device). The IDs collected by the device (e.g., from its surrounding) may be matched against the IDs (e.g., from the retail store or associated therewith) that may have been configured and linked with one or more advertisement IDs.

In examples herein, such systems and/or methods that may match or compare IDs that may be linked with advertisement IDs may be tag and/or touch initiated and/or automatic. For example, in a tag touch initiated mode, a tracking message may be generated when a user (e.g., via his or her device) may touch a specific tag (e.g., in a retail store) such as a NFC (near field communication) tag or scan a bar code like 2D barcode with the mobile device. In automatic mode, a client application (e.g., or an application) running on user's device may receive the ad, and a collection of the IDs that may be linked to locations (e.g., such as a retail store). The client may send a tracking message, for example, if or when it may determine or notice that a device associated with a user read an ID that may be configured to an advertisement the user may have seen.

FIG. 1 depicts an example block, diagram of a system 200 that may be used to track advertisement effectiveness, e.g., as described herein. As illustrated in FIG. 1, an advertisement and/or location configuration component or device 205 may be connected to and/or in communication (e.g., via a wired or wireless connection) with an advertisement server 210. The advertisement and/or location configuration component or device 205 may provide IDs that may be linked to locations and advertisements (e.g., associated with the locations). The advertisement server 210 may store the IDs that may be linked as described herein. The advertisement server 210 may be connected to and/or may be in communication with (e.g., via a wired or wireless connection) a device 245, for example, via a client application 215 and an advertisement (ad) location watchdog component 220. The watchdog component (e.g., watchdog function) 220 may or may not be associated with the client application 215. The device 245 may store ad IDs and/or location IDs in a storage (e.g., a local storage) 225. The device 245 may be a mobile computing device (e.g., a smart phone). According to examples, the watchdog component 220 may periodically check whether an ID that has been linked to an advertisement and has been seen by a user of the device may be detected by the device 245 (e.g., may have been viewed on the device and/or the device may be in a location associated with the ad). If the watchdog component 220 detects such an occurrence, it may send an ID of the advertisement together with the ID of the location to the ad configurator and/or the ad server.

In an example, the client application 215 on the device 245 may connect to and/or communicate with a tag 230. The tag 230 may be a near field communication (NFC) tag, ultra-high frequency (UHF) tag, an optically recognizable tag such as, for example, 2D bar code, and/or the like and may be in a retail store. In an example, the user of the device 245 may tap the device on the tag 230 to connect to the tap and/or may automatically connect to the tag 230 upon, for example, entering the retail store in which the tag 230 may be located or being in close proximity to the tag. The mobile device 245 may include the client application 215 and/or the watchdog component (e.g., watchdog function) 220. The tag 230 may provide and/or send a unique tag identifier to device 245 (e.g., to the watchdog component 220 of the device 245). The device 245 may store such information from the tag and/or may provide the information to the ad location watchdog component 220.

As shown, in examples, the ad location watchdog component 220 may be in communication with a Bluetooth component 235 and/or a WLAN 240. In such an example, the watchdog component 220 may be looking for one or more of SSIDs of WLANs and/or Bluetooth IDs of devices that may be detected by or detectable by the mobile device. Similar to examples described herein (e.g., above), these IDs may be checked against the IDs linked to ads the user or the user's device may have seen and/or displayed, and in case there is a match, the ad ID and location ID linked to the SSID or Bluetooth ID may be sent to the ad configurator and/or the ad server.

According to an example (e.g., when configuring an ad in the back end server such as the ad configurator, ad server, and/or the like), the ad may be linked with IDs representing the locations to which the ad may be placed and/or designed to attract visitors. These IDs may be or may include IDs of BLE tags, NFC tags, RFID tags, WLAN SSIDs, or any IDs the device 245 may read from its surroundings, e.g., via the client software (e.g., 215) device 245 may be running. These IDs may include, for example, the IDs associated with the tag 230 in FIG. 1. As described herein, the tags (e.g., 230) may be placed in a retail store and may be used to determine an effectiveness associated with whether an ad displayed on a device (e.g., via the client application 215) may result in a user visiting the retail store associated with the ad, e.g., as described herein.

Figure 2:
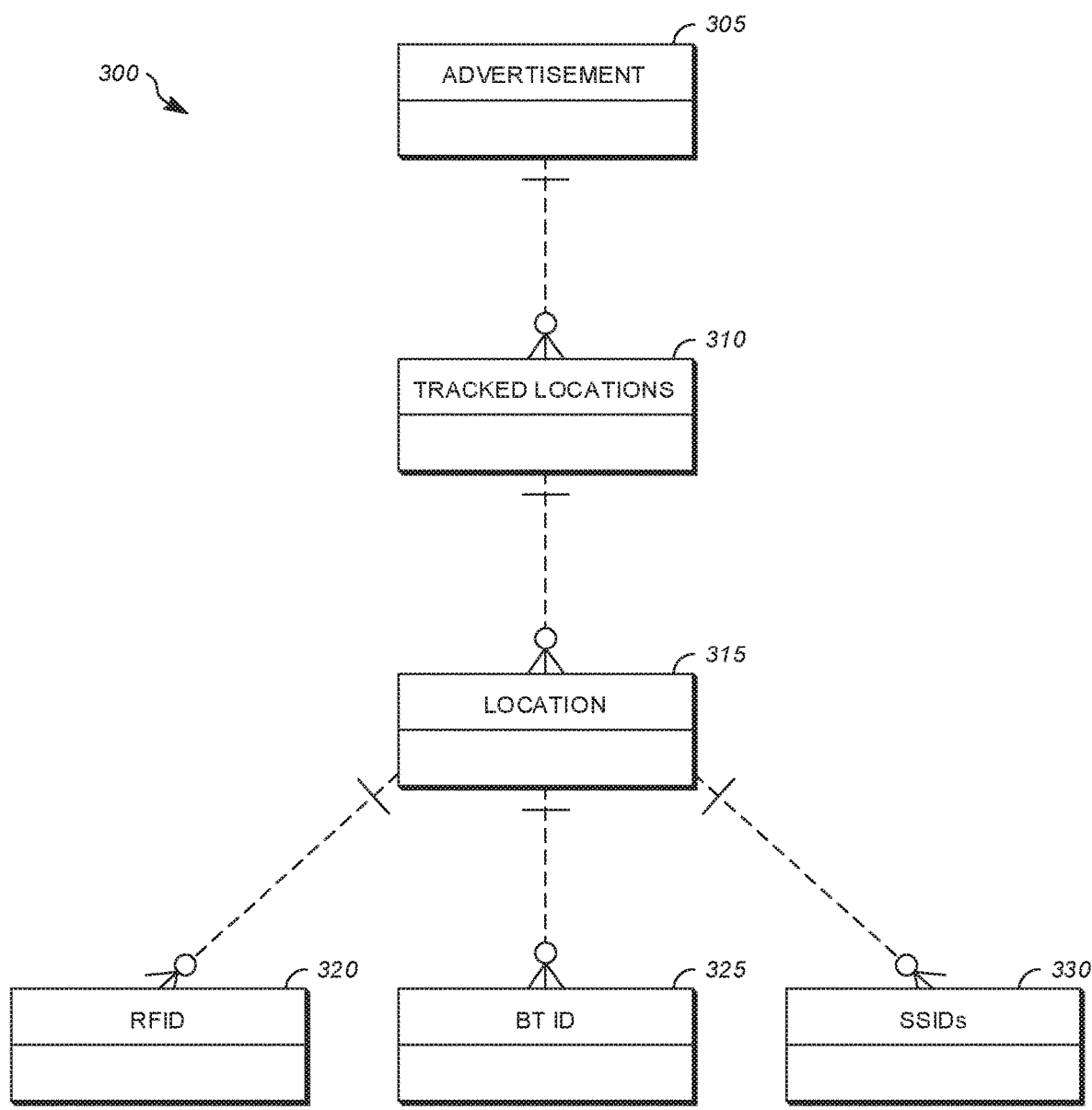
FIG. 2 depicts an example entity relationship diagram or data model that may be used to track advertisement effectiveness as described herein.

FIG. 2 depicts an example entity relationship diagram or data model 300 that may be used to track advertisement effectiveness, e.g., as described herein. For example, as shown in FIG. 2, an ad 305 may define and/or may have associated therewith a set of tracked locations 310. The tracked locations 310 may include and/or may be a set of locations 315 associated with the ad 305 (e.g., retail location of a company associated with the ad 305). The set of locations 315 may include IDs including, for example, Bluetooth IDs 325 associated with BLE tags, SSIDs 330 of WLAN networks, IDs 320 of RFID tags, and/or the like. As described herein, the tags and locations 315 that that may be tracked (e.g., may be included in the tracked locations 310) may be or may include locations of retail stores associated with a company, retailer, business, and/or the like that may provide the ad 305. Further, in an example, the tags and locations 315 associated therewith may be used to determine whether the ad 305 may be effective (e.g., to determine whether a user of a device that receives the ad 305 may visit one or more of the locations 310).

For example, when a user with a device (e.g., a mobile device) visits a store or location 315, the user may connect to a tag and may receive an ID such as the ID 320 of an RFID tag, the Bluetooth (BT) ID 325, and/or the SSID 330 that may be accessed at location 315. The location 315 may be included in the tracked locations 310 associated with the advertisement 305. Such tracked locations 310 may indicate one or more of the locations 315 in which the advertisement 305 may be effective (e.g., one or more locations 315 in which the user may have visited associated with the advertisement 305 he or she may have viewed on his or her device).

According to examples herein, as a user may move to different places or locations, the ad location watchdog component (e.g., 220) may record the IDs, and as the user moves around the watchdog will record the SSIDs (e.g., 330), BT IDs (e.g., 325), and IDs of RFIDs (e.g., 320) associated with the tags the device may connect to and/or read (e.g., the IDs the device may see). In an example, RFID (e.g., HF RFID like NFC) recording may include the user actually touching the tag with his device to receive the IDs and/or for SSIDs and BT IDs such IDs may be received (e.g., automatically) when visiting the location (e.g., 315) associated therewith (e.g., when the device has the respective radios turned on). According to an example (e.g., whenever an ad is shown to a user, for example, on a display of the device), the ad location watchdog component (e.g., 220) may store a log event including the ad together with the related location (e.g., 310) IDs (e.g., 320, 325, 330) and a timestamp for later reference.

Figure 3:
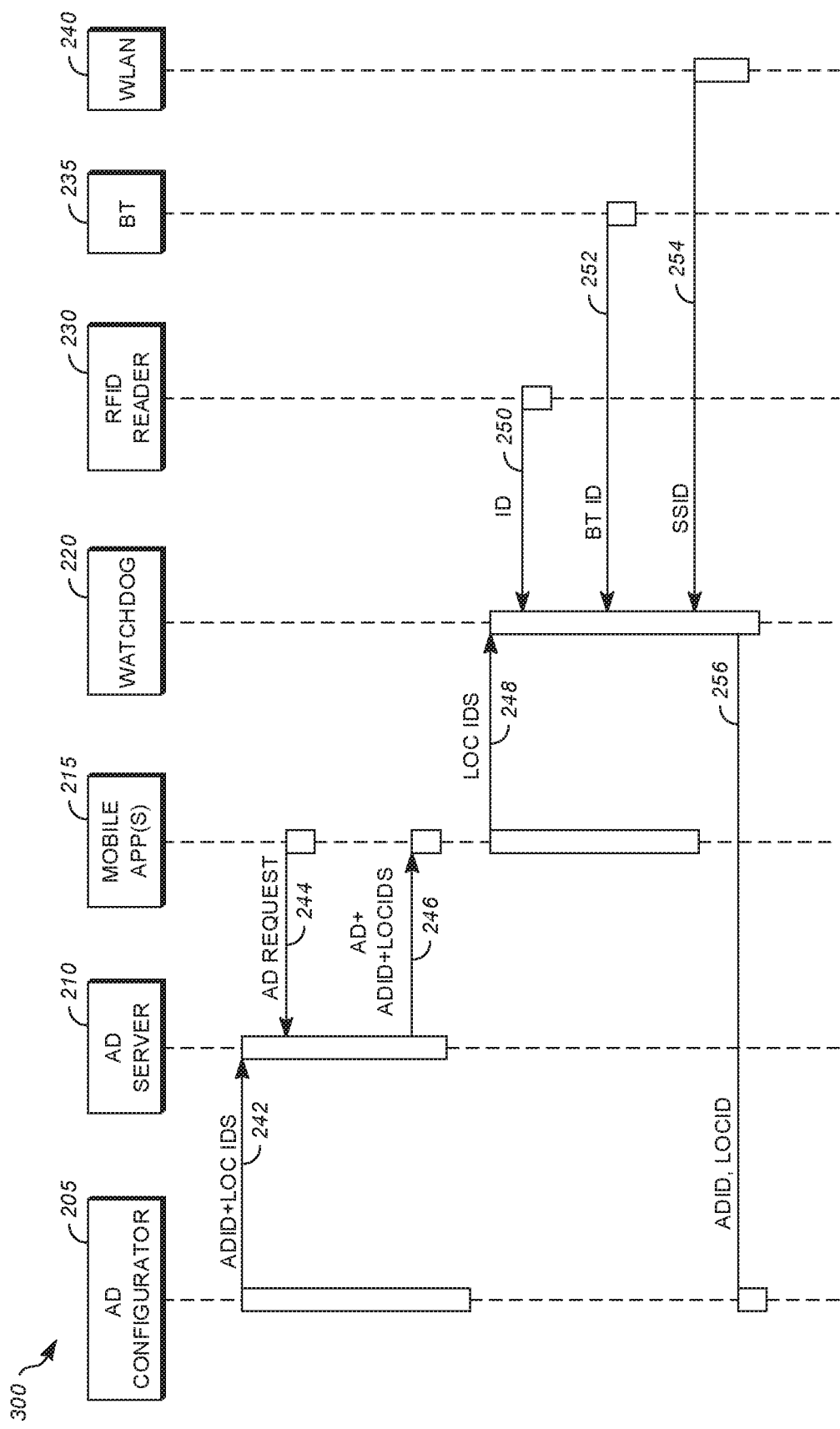
FIG. 3 illustrates an example method for tracking advertisement effectiveness as described herein.

FIG. 3 illustrates an example method for tracking advertisement effectiveness, e.g., as described herein. As shown in FIG. 3, at 242, a list of locations or a map of locations from which an advertiser, a business, a retailer, an advertisement agency, and/or the like may select or pick one or more of the locations to track for an advertisement (e.g., 305 of FIG. 2) may be provided and/or sent. For example, the ad configurator or ad and location configuration component 205 may provide, send, or present a user a list of locations or a map from which he or she may select locations to track (e.g., tracking locations) for the advertisement that may be being configured. The locations that may be selected by the user may be stored and/or linked at the ad server 210. For example, at 242, the ad (e.g., including the ad ID) and the respective location IDs or IDs of the selected locations may be received by the ad server 210. The respective location IDs or IDs associated with the selected locations may be stored and linked to the ad (e.g., via the ad ID as described herein) in the ad server 210.

As illustrated in FIG. 3, at 244 an ad request may be received by the ad server 210 from a device, e.g., a mobile device running a mobile application 215. The ad request may include the ad ID associated therewith and the list of locations for the ad and the ad ID. For example, the mobile application such as the client application 215 may send a request including, for example, an ID of the application, context information associated with the application including GPS coordinates and state information of the application such as an ID of a page for an ad that may be received by the ad server 210. As illustrated in FIG. 3, at 246, the mobile app 215 on the device may receive from the ad server 210 the ad, the ad ID associated with the ad, and the location IDs for the requested ad and the ad ID. As such, according to examples herein, when an application (e.g., the client application 215) may request an ad (e.g., at 244), the list of locations may be sent or returned together with the actual ad (e.g., and the ad ID) from the ad server 210 (e.g., at 246).

As illustrated in FIG. 3, at 248, the ad ID associated with the ad and/or the location IDs (e.g., the respective locations to be tracked such as the tracking locations) may be provided to the watchdog component 220 of the device. For example, as illustrated in FIG. 3, at 248, when a user may open or view the ad on his or her device, the ad ID and/or the location IDs associated with the ad ID may be sent to the ad location watchdog component 220 of the device. According to examples, the ad location watchdog component 220 may periodically check for radio identifiers, e.g., SSIDs of available WLANs 240, BT IDs 235, etc. of devices surrounding it. At 252, a mobile device may receive a BT ID from a BT device 235. At 254, the mobile device may receive an SSID from a WLAN device 240. The BT ID and/or the SSID may be received while performing the periodic check for BT IDs and/or SSIDs.

In examples herein (e.g., independent of and/or in addition to automatic discovery of locations associated with the ads using SSID from a WLAN device 240 and/or BT ID from a BT device 235), NFC tags may be configured that may initiate or start the ad location watchdog component 220, at 248 (e.g., by providing an RFID rom an RFID device 230). In an example, as described herein (e.g., if or when an RFID received from a RFID reader 230 matches a list of trackable IDs), the ad location watchdog component 220, at 256, may send a message or a transmission with such information for the ad configurator and/or the ad server for tracking the location.

At 256, the watchdog component 220 may send a message or a transmission to the ad configurator 205 and/or the ad server 210 and/or other components not shown, e.g., when the watchdog component 220 determines that a location ID associated with an ad is set as a tracked location or that one or more of an RFID, a BT ID, or an SSID received by the watchdog component 220 matches a location ID associated with an ad that may have been viewed by the user of the mobile device. When advertisements are configured in the in ad configurator 205, the locations to be tracked for the specific advertisement can be set. For example, a location may be set as a tracked location if a user may have visited the location of the ad he or she may view and/or the device associated with a user may have received an RFID, an SSID, or a BT ID, and/or the like at a retail location associated with the ad that may have been viewed by the user on the device (e.g., resulting in the ad being tracked to the location or the tracked location).

The message or the transmission sent to the ad configurator 205 and/or the ad server 210 may include the ad ID, the location ID of the ad viewed and/or visited by the user, a timestamp of location event (e.g., when the user visited the retail store), and/or a timestamp of the ad view event (e.g., when the user viewed the ad). The ad configurator 205 and/or the ad server 210 may accumulate the messages from each of the users (e.g., that may view an ad and/or visit a location associated therewith). Based on this data, an effectiveness analysis component (not shown), which may be an independent component or part of the ad configurator 205, ad server 210, or other components shown, may calculate the statistics on how many users that viewed the ad visited the retail store and/or a location of a retail store.

The systems and/or methods herein may be used in one or more of the following examples (e.g., that may be illustrative as additional examples may also be provided and/or used). For example, a device may include a mobile newspaper application. The mobile newspaper application may collect an audit trail of advertisements or ads that users may have viewed or seen. As described herein, the locations of the ads (e.g., locations IDs) may also be known or determined such that the locations may be tracked. In an example, the user that may have viewed the ad may visit a place or location that may be linked to the ad through a WLAN SSID, BT ID of a beacon, a RFID tag that the user may touch with her or his device, and/or the like. The location information along with the ad may be provided to the newspaper such that the newspaper may be able to determine the effectiveness of the ads and/or adjust prices of the ads accordingly.

Further, in an example, a retail store such as a retail store that may be selling sporting goods and/or other goods or services may run a mobile advertisement campaign. The retail store may wish or want to measure the effectiveness of the campaign. As such, in an example, if or when creating an ad in the advertisement management system associated with the campaign, SSIDs of WLANs in the retail store may be registered as locations related to the ad as described herein (e.g., may be linked to the ad).

A watchdog component (e.g., the ad location watchdog component) may be configured, e.g., when a user sees the ad on his or her device. The watchdog component may be configured to receive radio identifiers (e.g., BT ID, SSID, RFID, etc.) and/or send and/or respond to the related radio identifiers, as described herein. In an example, the watchdog component may save or store the IDs of locations or tags possibly including radio identifiers (e.g., BT ID, SSID, RFID, etc.) together with the ad ID to the list of IDs it may be watching. Further, in an example (e.g., when a user who may have seen the ad walks to the retail store), the watchdog component may send a message including the ad ID to a back end system (e.g., the ad server or via the ad server). The back end system (e.g., the ad sever or via the ad server) may receive an event for each user who may have seen the ad and visited the retail store. The back end system may also know how many users have seen the ad and, in an example, a percentage of people that actually visited the shop (e.g., that may have seen the ad); such percentage may be a measure of ad effectiveness.

The retail store may have registered tag IDs to the ad. Such tag IDs may make it possible for the retail store to determine and/or know what share of users may have seen the ad bought and/or paid for a good or service at a point of sale terminal or cash register. In such an example, the user may tap or touch a tag (e.g., a RFID tag/reader) attached to the cash register and/or may use her or his device for paying the goods or services (e.g., via the RFID tag/reader). Based on timestamps from the point of sale terminal or register and the device (e.g., a client application therein as described herein), a determination may be made as to whether the user that may have viewed the ad and/or visited the retail store, bought a good or service associated with the ad.

In one or more examples herein, a retail store (e.g., a fashion and/or other store) may have and/or provide a loyalty card program where a user may earn points based on purchasing things that may have been advertised. According to an example (e.g., when user views or sees an ad), the watchdog component may be configured to alert on SSIDs, BT IDs. RFIDs, and/or the like related to or associated with the ad as described herein. In such an example (e.g., if the user may visit or walk into the retail store), the watchdog component may send the event to the back end system and/or a loyalty application that may be on a device associated with the user may 1 remind the user about the ad he or she may have seen and the benefit he or she may get by purchasing the product associated with the ad. A similar event may be created, in examples, if user may touch a registered RFID tag with his or her device and/or if his or her device may connect to or communicate with (e.g., hear) a BT ID of a registered beacon associated with the ad.

As described herein, the systems and/or methods herein may enable analysis of on-line ad effectiveness for non-on-line (e.g., a brick and mortar) business location. The data collection (e.g., in an automatic mode) may be performed or may place without user action. Further, in examples (e.g., in a RFID tag based mode), a user may touch or tap the tag in the retail store to log an event and/or invoke or initiate the watchdog component (e.g., and compared to the automatic mode, it saves energy as no polling is required from the watchdog module.

In examples herein, tracking locations for a device (e.g., when he or she visits a retail store) and/or an ad may be based on a permission from the user. Further, in examples, tracking SSIDs, BLE tags, Bluetooth IDs, and/or the like may consume power that may make the battery of user's device to drain faster than normal and as such the user may provide a permission to do so. Further, in examples, in a tag initiated mode as described herein, the tag may be provisioned or configured such that the watchdog component may be initiated or started as the tag may be tapped or touched.

Figure 4:
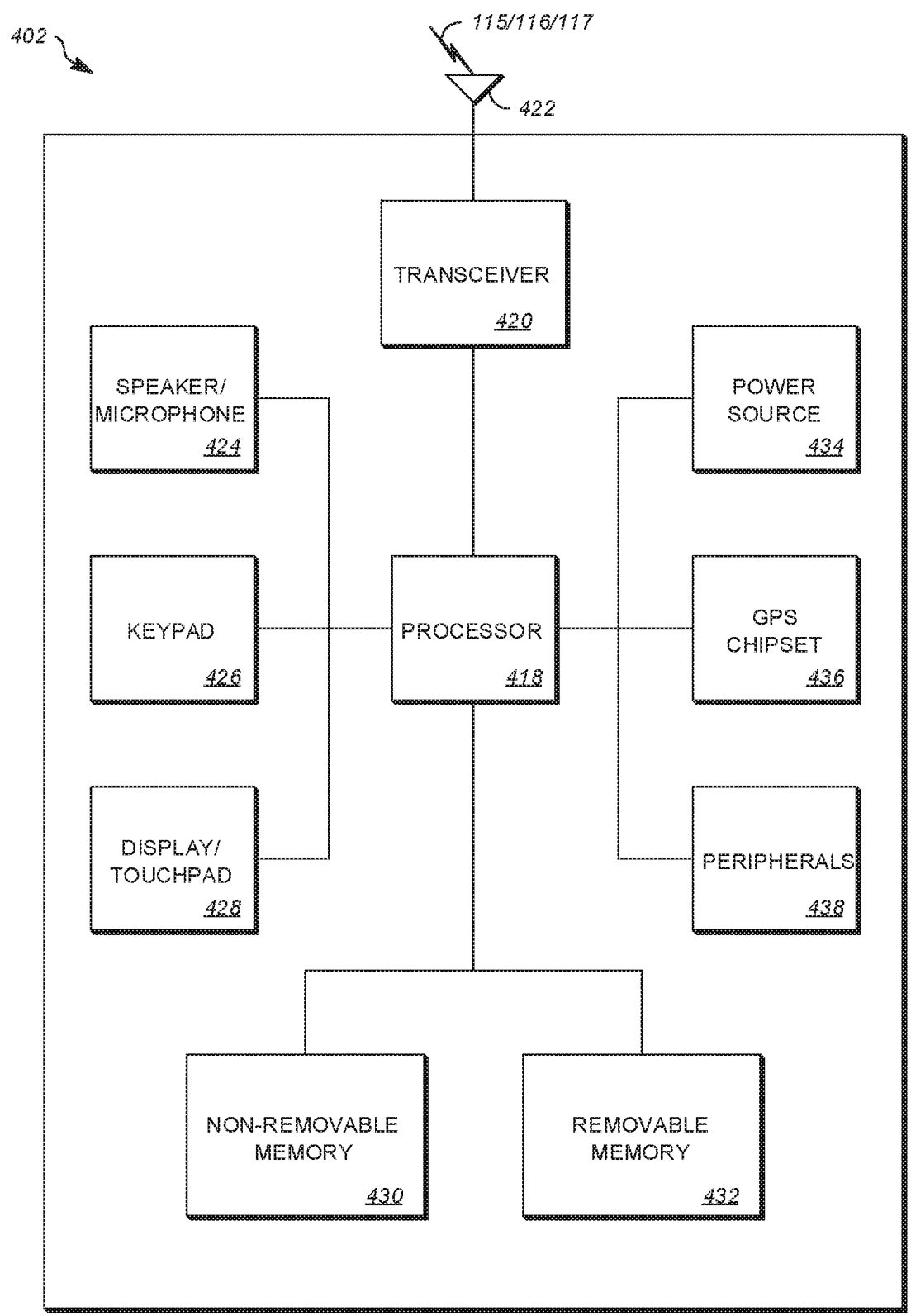
FIGS. 4-5 illustrate example system architectures of devices or systems that may be provided and/or used to track advertisement effectiveness as described herein.

FIG. 4 depicts an example system diagram of one or more components or additional components that may be included in the device such as a mobile device, a wearable device such as smart glasses, the ad server, the watchdog component, the ad configurator, and/or the like as described herein. As shown in FIG. 4, the components of the device may include a processor 418, a transceiver 420, a transmit/receive element 422, a speaker/microphone 424, a keypad 426, a display/touchpad component or interface 428 (e.g., an interface for the display or screen 104 and/or 204), non-removable memory 430, removable memory 432, a power source 434, a global positioning system (GPS) chipset 436, and other peripherals 438. It may be appreciated that the device may include any sub-combination of the foregoing elements while remaining consistent with an embodiment. Also, embodiments contemplate that other devices and/or servers or systems described herein, may include some or all of the elements depicted in FIG. 4 and described herein.

The processor 418 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 418 may perform signal coding, data processing, power control, input/output processing, and/or any other functionality that may enable the device to operate in a wireless environment. The processor 418 may be coupled to the transceiver 420, which may be coupled to the transmit/receive element 422. While FIG. 4 depicts the processor 418 and the transceiver 420 as separate components, it may be appreciated that the processor 418 and the transceiver 420 may be integrated together in an electronic package or chip.

The transmit/receive element 422 may be configured to transmit signals to, or receive signals from, another device (e.g., the user's device and/or a network component such as a base station, access point, or other component in a wireless network) over an air interface 415. For example, in one embodiment, the transmit/receive element 422 may be an antenna configured to transmit and/or receive RF signals. In another or additional embodiment, the transmit/receive element 422 may be an emitter/detector configured to transmit and/or receive IR, UV, or visible light signals, for example. In yet another or additional embodiment, the transmit/receive element 422 may be configured to transmit and receive both RF and light signals. It may be appreciated that the transmit/receive element 422 may be configured to transmit and/or receive any combination of wireless signals (e.g., Bluetooth, WiFi, and/or the like).

In addition, although the transmit/receive element 422 is depicted in FIG. 4 as a single element, the device may include any number of transmit/receive elements 422. More specifically, the device may employ MIMO technology. Thus, in one embodiment, the device may include two or more transmit/receive elements 422 (e.g., multiple antennas) for transmitting and receiving wireless signals over the air interface 415.

The transceiver 420 may be configured to modulate the signals that are to be transmitted by the transmit/receive element 422 and to demodulate the signals that are received by the transmit/receive element 422. As noted above, the device may have multi-mode capabilities. Thus, the transceiver 420 may include multiple transceivers for enabling the device to communicate via multiple radio access technologies (RATs), such as UTRA, and Institute of Electrical and Electronics Engineers (IEEE) 802.11, for example.

The processor 418 of the device may be coupled to, and may receive user input data from, the speaker/microphone 424, the keypad or touch interface 426, and/or the display/touchpad 428 (e.g., a liquid crystal display (LCD) display unit or organic light-emitting diode (OLED) display unit). The processor 418 may also output user data to the speaker/microphone 424, the keypad 426, and/or the display/touchpad 428. In addition, the processor 418 may access information from, and store data in, any type of suitable memory, such as the non-removable memory 430 and/or the removable memory 432. The non-removable memory 430 may include random-access memory (RAM), read-only memory (ROM), a hard disk, or any other type of memory storage device. The removable memory 432 may include a subscriber identity module (SIM) card, a memory stick, a secure digital (SD) memory card, and the like. In other embodiments, the processor 618 may access information from, and store data in, memory that is not physically located on the device, such as on a server or a home computer (not shown). The removable memory 430 and/or non-removable memory 432 may store a user profile or other information associated therewith that may be used as described herein.

The processor 418 may receive power from the power source 434, and may be configured to distribute and/or control the power to the other components in the device. The power source 434 may be any suitable device for powering the device. For example, the power source 434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 418 may also be coupled to the GPS chipset 436, which may be configured to provide location information (e.g., longitude and latitude) regarding the current location of the device. In addition to, or in lieu of, the information from the GPS chipset 436, the device may receive location information over the air interface 415 from another device or network component and/or determine its location based on the timing of the signals being received from two or more nearby network components. It may be appreciated that the device may acquire location information by way of any suitable location-determination method while remaining consistent with an embodiment.

The processor 418 may further be coupled to other peripherals 438, which may include one or more software and/or hardware modules that provide additional features, functionality and/or wired or wireless connectivity. For example, the peripherals 438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 5:
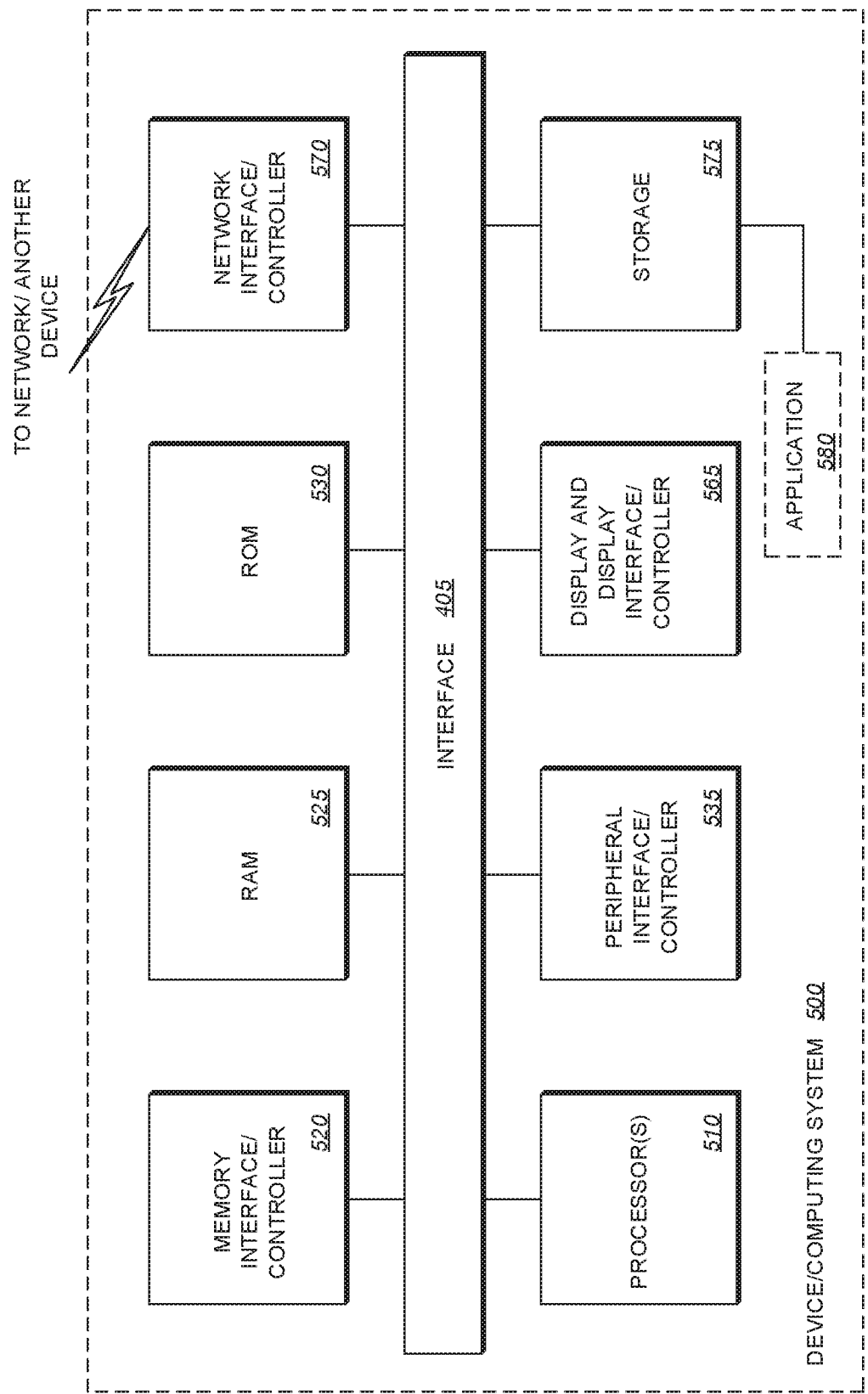

FIG. 5 depicts a block diagram of example components that may be included in the device such as a mobile device, a wearable device such as smart glasses, the ad server, the watchdog component, the ad configurator, and/or the like as described herein. The components of the device may be capable of executing a variety of computing applications 580. The computing applications 580 may be stored in a storage component 575 (and/or RAM or ROM described herein). The computing application 580 may include a computing application, a computing applet, a computing program and other instruction set operative on the computing system 500 to perform at least one function, operation, and/or procedure as described herein. According to an example, the computing applications may include the methods and/or applications described herein. The device may be controlled primarily by computer readable instructions that may be in the form of software. The computer readable instructions may include instructions for the device for storing and accessing the computer readable instructions themselves. Such software may be executed within a processor 510 such as a central processing unit (CPU) and/or other processors such as a co-processor to cause the device to perform the processes or functions associated therewith. The processor 510 may be implemented by micro-electronic chips CPUs called microprocessors.

In operation, the processor 510 may fetch, decode, and/or execute instructions and may transfer information to and from other resources via an interface 505 such as a main data-transfer path or a system bus. Such an interface or system bus may connect the components in the device and may define the medium for data exchange. The device may further include memory devices coupled to the interface 505. According to an example embodiment, the memory devices may include a random access memory (RAM) 525 and read only memory (ROM) 530. The RAM 525 and ROM 530 may include circuitry that allows information to be stored and retrieved. In one embodiment, the ROM 530 may include stored data that cannot be modified. Additionally, data stored in the RAM 525 typically may be read or changed by the processor 510 or other hardware devices. Access to the RAM 525 and/or ROM 530 may be controlled by a memory controller 520. The memory controller 520 may provide an address translation function that translates virtual addresses into physical addresses as instructions are executed.

In addition, the may include a peripherals controller 535 that may be responsible for communicating instructions from the processor 510 to peripherals such as a printer, a keypad or keyboard, a mouse, and a storage component. The device may further include a display controller 565. The display/display controller 565 may be used to display visual output generated by the device. Such visual output may include text, graphics, animated graphics, video, or the like. The display controller associated with the display (e.g., shown in combination as 565 but may be separate components) may include electronic components that generate a video signal that may be sent to the display. Further, the device may include a network interface or controller 570 (e.g., a network adapter) that may be used to connect the device to an external communication network and/or other devices (not shown).

Figure 6A:
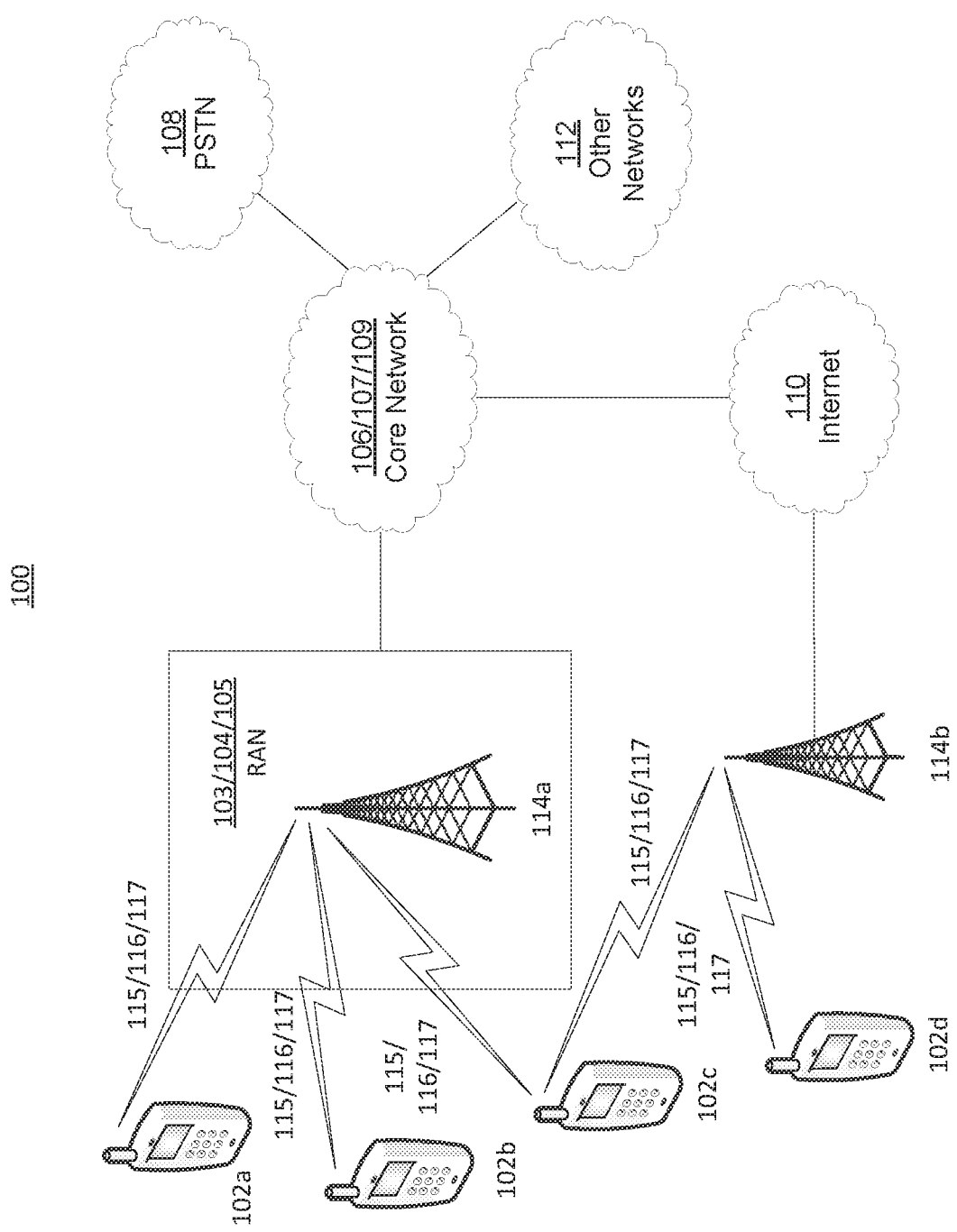
FIG. 6A depicts a diagram of an example communications system in which one or more disclosed examples watches or devices may be implemented and/or may be used with one or more of the example watches or devices described herein.

FIG. 6A depicts a diagram of an example communications system 900 in which one or more disclosed embodiments such as the example devices such as the mobile devices, wearable devices (e.g., smartwatches and/or smart glasses), the ad server, the watchdog component, the ad configurator, and/or the like may be implemented and/or may be used. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 6A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA. FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856). Global System for Mobile communications (GSM), Enhanced Data rates for GSM Evolution (EDGE), GSM EDGE (GERAN), and the like.

The base station 114b in FIG. 6A may be a wireless router, Home Node B, Home eNode B. or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 6A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 6A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b. 102c, and/or 102d may include multiple transceivers for communicating with different wireless networks over different wireless links. For example, the WTRU 102c shown in FIG. 6A may be configured to communicate with the base station 114a, which may employ a cellular-based radio technology, and with the base station 114b, which may employ an IEEE 802 radio technology.

Figure 6B:
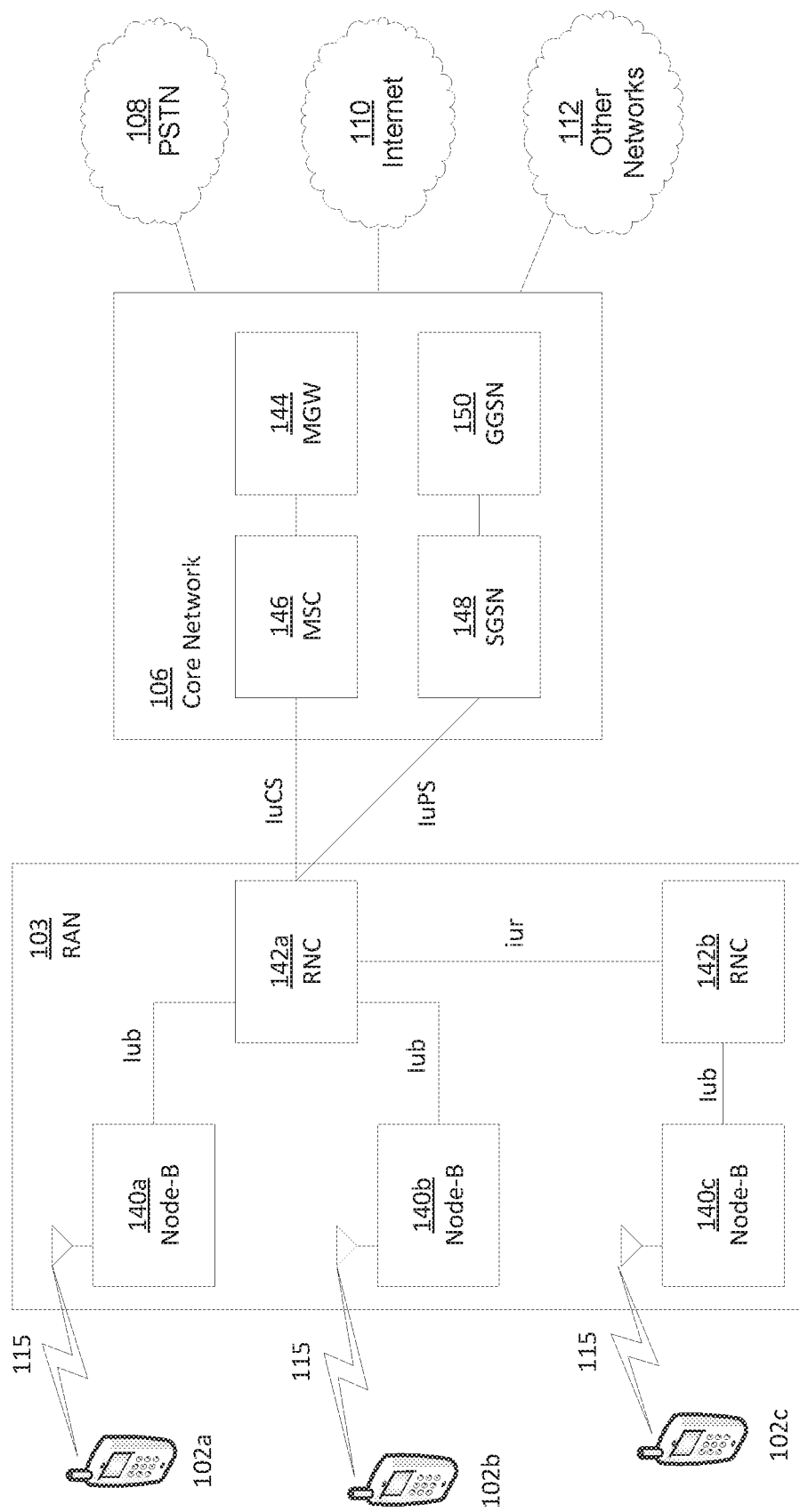
FIG. 6B depicts a system diagram of an example radio access network and an example core network that may be used within the communications system illustrated in FIG. 6A.

FIG. 6B depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 6B, the RAN 103 may include Node-Bs 140a, 140b, and/or 140c, which may each include one or more transceivers for communicating with the WTRUs 102a, 102b, and/or 102c over the air interface 115. The Node-Bs 140a. 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 6B, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 6B may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 6C:
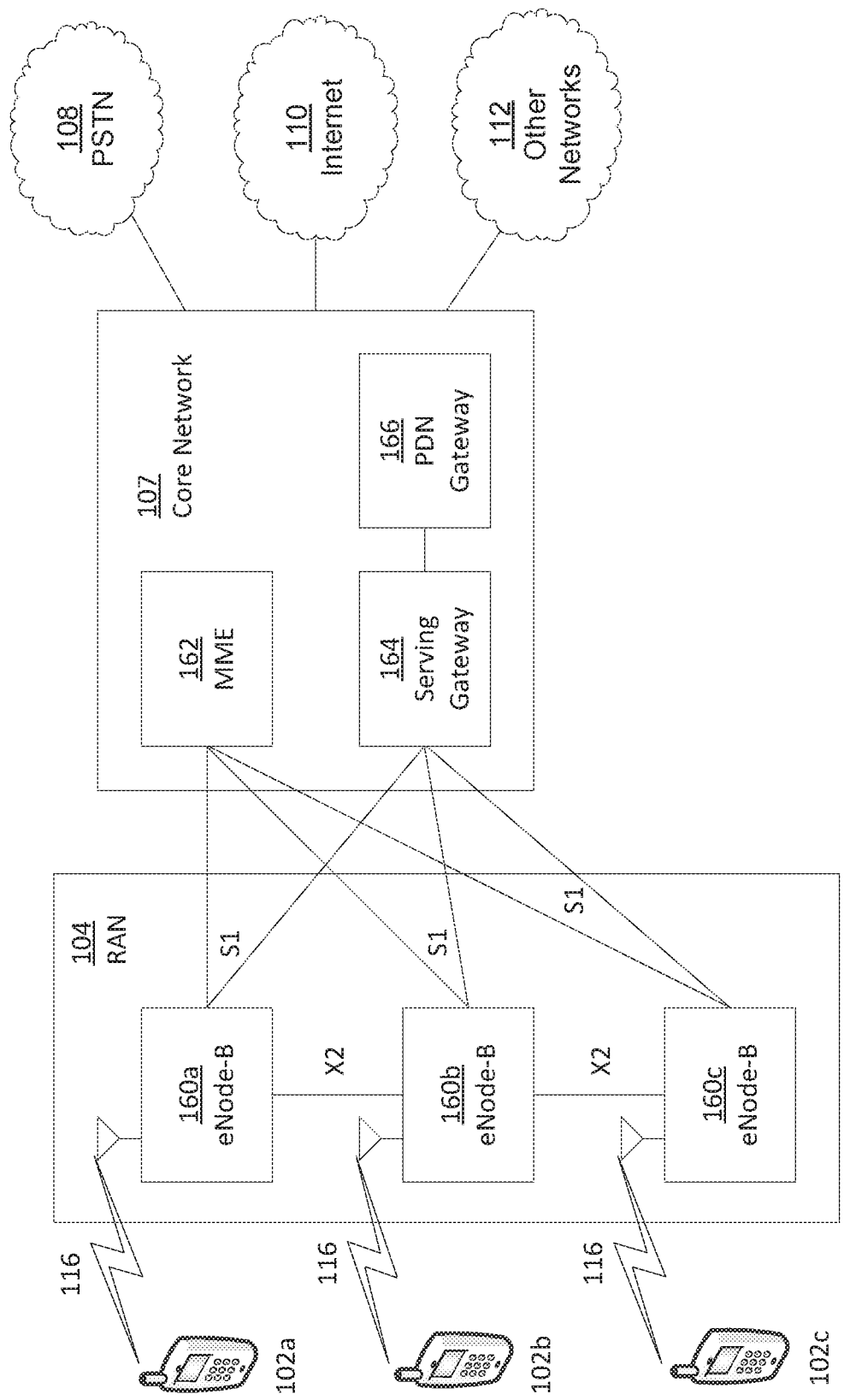
FIG. 6C depicts a system diagram of another example radio access network and an example core network that may be used within the communications system illustrated in FIG. 6A.

FIG. 6C depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 6C, the eNode-Bs 160a, 160b, and/or 160c may communicate with one another over an X2 interface.

The core network 107 shown in FIG. 6C may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 6D:
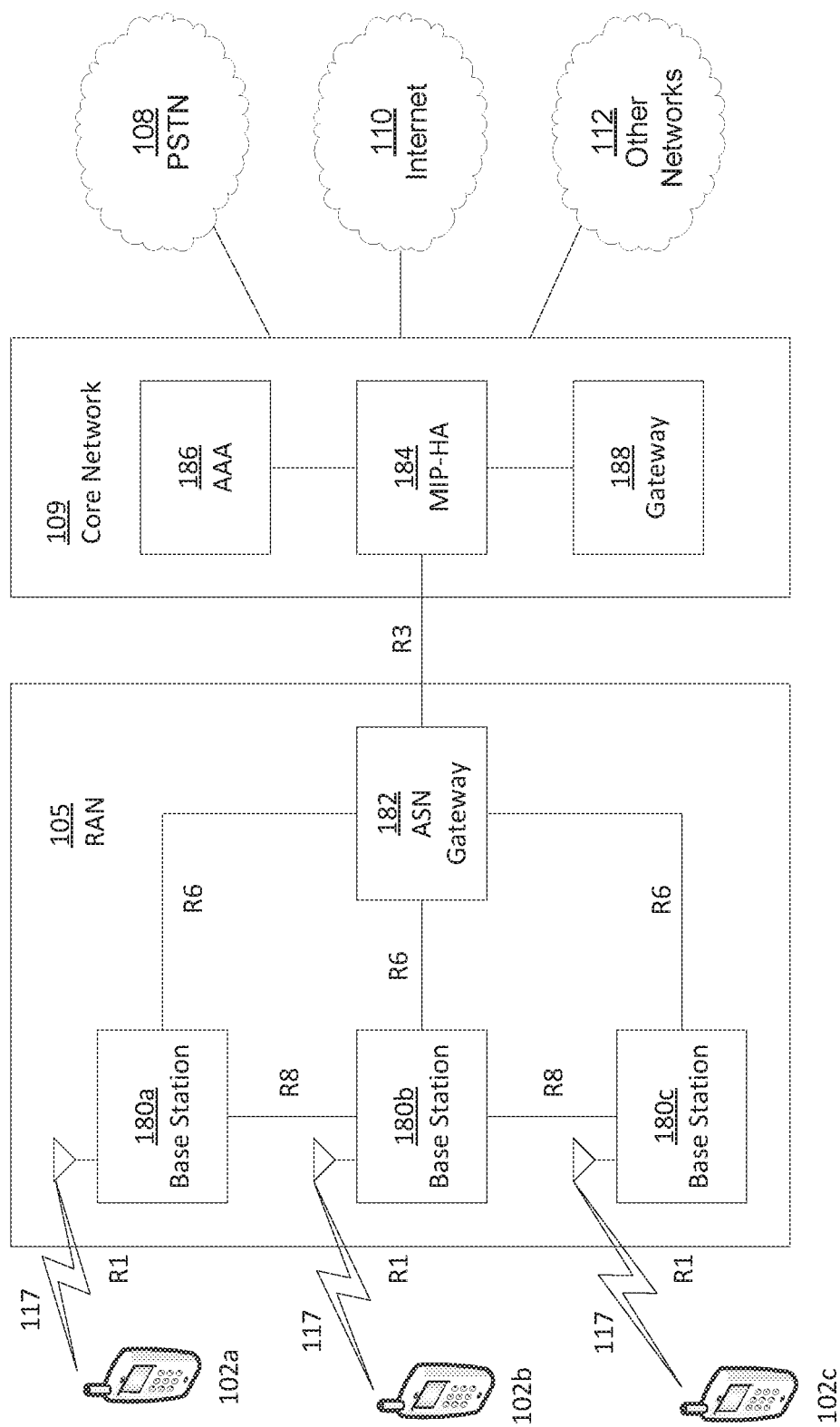
FIG. 6D depicts a system diagram of another example radio access network and an example core network that may be used within the communications system illustrated in FIG. 6A.

FIG. 6D depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 6D, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 6D, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a. 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a. 102b, and/or 102c with access to circuit-switched networks, such as the PSTN 108, to facilitate communications between the WTRUs 102a. 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 6D, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a. 102b, and/or 102c between the RAN 105 and the other ASNs. The communication link between the core network 109 and the other core networks may be defined as an R5 reference, which may include protocols for facilitating interworking between home core networks and visited core networks.

Although the terms device, smartwatch, wearable device, and/or the like may be used herein, it may and should be understood that the use of such terms may be used interchangeably and, as such, may not be distinguishable.

Further, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for determining advertisement effectiveness, the method comprising:
   a mobile device sending an advertisement request to an advertisement server, wherein the advertisement request comprises an advertisement identifier associated with an advertisement;
   the mobile device receiving from the advertisement server, the advertisement, the advertisement identifier and a location identifier associated with the advertisement;
   the mobile device storing the advertisement, the advertisement identifier associated with the advertisement and the location identifier associated with the advertisement;
   the mobile device displaying the stored advertisement to a user;
   a watchdog component on the mobile device periodically scanning for a radio identifier that is associated with the stored advertisement;
   the mobile device receiving the radio identifier, wherein the radio identifier is received locally via a short range signal;
   the watchdog component on the mobile device comparing the radio identifier received locally via the short range signal with the stored location identifier associated with the stored advertisement that was displayed to the user; and
   on a condition the stored location identifier associated with the stored advertisement that was displayed to the user matches with the radio identifier received locally via the short range signal, the watchdog component sending a message to the advertisement server, wherein the message indicates the stored location identifier associated with the stored advertisement that was displayed to the user and the stored advertisement identifier associated with the stored advertisement.

2. The method of claim 1, further comprising storing a first timestamp based on when the stored advertisement is displayed to the user.

3. The method of claim 2, further comprising:
   storing a second timestamp based on when the locally received radio identifier matches the stored location identifier; and
   sending the first timestamp and the second timestamp to the advertisement server when the locally received radio identifier matches the stored location identifier.

4. The method of claim 1, wherein the advertisement request further comprises one or more of an application identifier, context information associated with an application, one or more global positioning system (GPS) coordinates, or application state information.

5. The method of claim 1, wherein the watchdog component is initiated based on a radio frequency identification (RFID).

6. The method of claim 1, further comprising presenting to the user an address or a map related to a location associated with the stored advertisement, wherein the location is associated with the stored location identifier.

7. The method of claim 1, wherein the radio identifier received locally comprises one or more of a service set identifier (SSID), a Bluetooth identifier (BT ID), a near field communication (NFC) tag identifier, or a radio frequency identification (RFID) identifier.

8. A mobile device associated with determining advertisement effectiveness, the mobile device comprising:
a display unit; and
a processor configured to at least:
send an advertisement request to an advertisement server, wherein the advertisement request comprises an advertisement identifier associated with an advertisement;
receive from the advertisement server, a response comprising the advertisement, the advertisement identifier and a location identifier associated with the advertisement;
store the advertisement, the advertisement identifier associated with the advertisement and the location identifier associated with the advertisement;
display the stored advertisement on the display unit;
the mobile device having a watchdog component configured to periodically scan for a radio identifier associated with the stored advertisement;
the processor configured to receive the radio identifier, wherein the radio identifier is received locally via a short range signal; and
the watchdog component further configured to:
compare the radio identifier received locally via the short range signal with the stored location identifier associated with the stored advertisement that was displayed to a user, and
on a condition the stored location identifier associated with the stored advertisement that was displayed on the display unit matches with the radio identifier received locally via the short range signal, send a message to the advertisement server, wherein the message indicates the stored location identifier associated with the stored advertisement that was displayed to the user, and the stored advertisement identifier associated with the stored advertisement.

9. The mobile device of claim 8, wherein the processor is further configured to store a first timestamp based on when the stored advertisement is displayed to the user.

10. The mobile device of claim 9, wherein the processor is further configured to:
store a second timestamp based on when the locally received radio identifier matches the stored location identifier; and
send the first timestamp and the second timestamp to the advertisement server when the locally received radio identifier matches the stored location identifier.

11. The mobile device of claim 8, wherein the advertisement request further comprises one or more of an application identifier, context information associated with an application, one or more global positioning system (GPS) coordinates, or application state information.

12. The mobile device of claim 8, wherein the watchdog component is initiated based on a radio frequency identification (RFID).

13. The mobile device of claim 8, wherein the processor is further configured to present to the user an address or a map related to a location associated with the stored advertisement, wherein the location is associated with the stored location identifier.

14. The mobile device of claim 8, wherein the radio identifier received locally comprises one or more of a service set identifier (SSID), a Bluetooth identifier (BT ID), a near field communication (NFC) tag identifier, or a radio frequency identification (RFID) identifier.

* * * * *